(12) United States Patent
Türk

(10) Patent No.: US 6,659,542 B2
(45) Date of Patent: Dec. 9, 2003

(54) VEHICLE ROOF WITH SLIDING ROOF ELEMENT

(75) Inventor: Alexander Türk, Ditzingen (DE)

(73) Assignee: CTS Fahrzeugdach Systeme GmbH, Hamburg (DE)

( * ) Notice: Subject to any disclaimer, the term of this patent is extended or adjusted under 35 U.S.C. 154(b) by 0 days.

(21) Appl. No.: 10/016,818

(22) Filed: Dec. 13, 2001

(65) Prior Publication Data

US 2002/0074833 A1 Jun. 20, 2002

(30) Foreign Application Priority Data

Dec. 15, 2000 (DE) ............................... 100 62 718

(51) Int. Cl.[7] ............................................ B60J 7/053
(52) U.S. Cl. ..................................... 296/222; 296/223
(58) Field of Search ................................ 296/222, 223

(56) References Cited

U.S. PATENT DOCUMENTS

| | | | | |
|---|---|---|---|---|
| 4,601,512 A | * | 7/1986 | Boots | 296/221 |
| 4,913,486 A | * | 4/1990 | Staley et al. | 296/223 |
| 4,934,098 A | * | 6/1990 | Prouteau et al. | 296/222 X |
| 5,257,849 A | * | 11/1993 | Cheron et al. | 296/223 |

FOREIGN PATENT DOCUMENTS

| | | | |
|---|---|---|---|
| DE | 26 58 018 | | 7/1978 |
| DE | 34 16 176 | | 11/1984 |
| DE | 84 35 809 | | 10/1989 |
| DE | 0 648 629 | | 10/1993 |
| DE | 40 06 160 | | 1/1997 |
| DE | 196 35 145 | | 10/1997 |
| GB | 2090630 | * | 7/1982 ................. 296/222 |

* cited by examiner

Primary Examiner—Dennis H. Pedder
(74) Attorney, Agent, or Firm—Klaus J. Bach

(57) ABSTRACT

In a vehicle roof with a roof opening and a sliding roof element movable between a closed position in which the roof element is disposed in the roof opening and an open position in which the roof element is moved below a section of the vehicle roof behind the roof opening, wherein the roof opening is delimited by a guide frame provided with a guide track structure including front and rear guide track channels into which guide pins of the roof element project, the guide track channels for the two guide pins have front sections with inclinations which are greater for the rear guide pin than for the front guide pin so that the rear end of the roof element is lowered faster during initial opening movement than the front end of the roof element and the guide pins are so mounted on the roof element as to be able to accommodate different distance requirements during transition of the roof element between the open and the closed positions.

9 Claims, 3 Drawing Sheets

VEHICLE ROOF WITH SLIDING ROOF ELEMENT

BACKGROUND OF THE INVENTION

The invention relates to a vehicle roof with a sliding roof element disposed in a roof opening which is delimited by a guide frame in which the sliding roof element is movable by an operating mechanism between a closed position and an open position in which the sliding roof element is disposed below a rear section of the vehicle roof.

DE OS 26 58 018 discloses a roof element in a vehicle roof opening which is movably supported in a frame delimiting the roof opening so as to adjustable between a closed position in which the roof opening is closed by the roof element and an open position in which the roof element extends over the surface of the roof. The transfer between the closed and the open positions occurs by an operating mechanism including levers hinged to the roof element and comprising a front lever which is engaged in a front guide track and a rear lever, which is engaged in a rear guide track mounted to the vehicle body. The two guide tracks are arranged longitudinally one after the other, within a guide structure. The two guide tracks extend each horizontally in the guide structure and facilitate lifting of the roof element at the front end thereof or at the rear end thereof or concurrent lifting of the front and rear ends of the roof element.

Such roof elements are used particularly in buses. They are generally not used in passenger cars since, with the high travel speeds of passenger cars, a lifting of the front end of the roof element is not possible because of the high wind resistance.

A similar vehicle roof is described in the publication DE 196 35 145 C1, which discloses also a guide bar structure with two guide bars which are disposed behind one another and which consist each of a plurality of sections with different inclinations alternating with horizontal sections. This arrangement provides for intermediate resting position of the roof element between the closed and the maximum open positions. The transfer to the open position, or respectively, the various intermediate positions is achieved by means of a drive carriage, which is movably supported by the guide frame and which engages the guide track by way of guide pins. Depending on the actual position of the drive carriage, guide pins are disposed in different sections of the guide tracks and thereby guide the roof element to the various positions.

Neither of the two references discloses a sliding roof element that can be moved below the plane of the roof and under a roof section adjacent the roof opening. The printed publication EP 648 624 B1 discloses a sliding roof with a roof element which, in the open position, is moved below a roof section behind the roof opening. The guide mechanism operating the roof element however is not disclosed in this publication.

The printed publication DE 84 35 809 U1 discloses a vehicle roof with a slidable roof element disposed in a vehicle roof opening which can be moved during transition from a closed to an open position in a combined longitudinal and vertical motion under a rear part of the vehicle roof. The operating mechanism providing for the movement of the roof element comprises two separate tracks, which are arranged one after the other in the longitudinal direction of the vehicle, and into each of which a guide pin extends. The two guide tracks have vertical inclinations and are disposed at different height levels wherein the rear guide track has a greater inclination and also a greater height difference between the front end and the rear end thereof. The shapes of the guide tracks need to be adapted to each other since otherwise the guide pins might lock in the guide tracks. As a result, the design freedom of this structure is limited.

For general technological background information reference is further made to the publications DE 3 616 176 A1 and DE 40 06 160 C2.

Based on this state of the art, it is the object of the invention to provide a vehicle roof with a roof opening and a movable roof element, which is disposed in the roof opening and which, during movement from a closed to an open position, can, with simple means, be lowered and moved below a roof section disposed behind the roof opening with only little intrusion into the vehicle interior.

SUMMARY OF THE INVENTION

In a vehicle roof with a roof opening and a sliding roof element movable between a closed position in which the roof element is disposed in the roof opening and an open position in which the roof element is moved below a section of the vehicle roof behind the roof opening, wherein the roof opening is delimited by a guide frame provided with a guide track structure including front and rear guide track channels into which guide pins of the roof element project, the guide track channels for the two guide pins have front sections with inclinations which are greater for the rear guide pin than for the front guide pin so that the rear end of the roof element is lowered faster during initial opening movement than the front end of the roof element and the guide pins are so mounted on the roof element as to be able to accommodate different distance requirements during transition of the roof element between the open and the closed positions.

During movement from the closed to the open position, the roof element is lowered below the section of the roof behind the roof opening in a combined vertical and longitudinal movement. The transfer movement is performed in such a way that, in the first phase of the movement, the front end and the rear end of the roof element are lowered vertically to a different degree whereby a diving motion of the roof element below the rear roof section is achieved. This has the advantage that the headroom of the front seat occupants is intruded as little as possible since, first the rear end of the roof element is lowered below the roof and the front end of the roof element is lowered vertically only during a later transfer phase. This diving motion of the roof element is achieved in that the front guide track has a smaller inclination than the rear guide track. The inclination or gradient is measured over the vehicle length, wherein a lower inclination of the front track with regard to the rear track provides for a lowering of the front end of the roof element over a distance in the direction of the longitudinal vehicle axis then for the rear end of the sliding roof element. The different inclinations or gradients also provide for a faster lowering of the rear end of the sliding roof element than for the front end of the sliding roof element at a given speed of movement along the longitudinal vehicle axis. Vice versa, the raising speed for the rear end of the roof element is greater than the raising speed of the front end of the roof element at the end of the closing movement of the sliding roof element. As a result, the head room of the front seat occupants is only little intruded by the sliding roof element during the opening and closing procedure.

At least one of the two guide pins extending into the guide tracks is supported on a length compensation element which provides for a length compensation for the respective pin with respect to the other during the transfer movement from the closed to the open position or vice versa. A length compensation may become necessary if the front and rear guide tracks include section with substantially different curvatures whereby during the various movement phases of the roof element different distances between the two guide pins are necessary. The length compensation element provides for such distance compensation between the two guide track pins.

The length compensation element is provided preferably in the form a slide slot in which a guide track member is disposed which is firmly connected to the guide pin.

Preferably, the front guide track consists of three sections of which the center section extends horizontally so that when the respective guide pin is received in this center section of the front guide track the roof element is not raised or lowered but performs only a horizontal sliding movement. Adjacent the horizontal center track section of the front guide track, there are end sections extending forwardly and rearwardly which are inclined in such a way that the front end section of the front guide track overcomes a smaller height difference than a front section of the rear guide track.

In this way, the front end of the roof element is lowered at the beginning of the opening movement only by a smaller amount than the rear end of the roof element during the same horizontal movement phase. With the different amount of lowering of the front end of the roof element with respect to the rear end thereof, the roof element is inclined in such a way that the front end which is disposed over the heads of the front seat occupants leaves sufficient head room for the occupants of the front seats.

When the front part has completed the vertical movement during the first phase of an opening movement of the roof element in accordance with the front section of the guide track a horizontal movement follows in the next phase of movement in accordance with the horizontal center section. In the last phase of movement, the front part of the roof element is further lowered in accordance with the rear inclined section of the front guide track down to a level, which permits sliding of the roof element below the rear roof section.

In a preferred embodiment of the invention, at least one of the two guide tracks, preferably however both guide tracks includes a parallel extending additional guide track section into which a positioning bolt extends. The additional guide track and the positioning bolt provide for a minimum engagement of the roof element in the guide tracks at opposite sides whereby any play between the guide track pins and the respective guide tracks can be eliminated and the roof element can be moved in a play- and noise-free manner. In addition, the additional guide tracks and the positioning bolts disposed therein can support the movement of the guide track pins particularly in curved sections or in transition areas between two guide track sections so as to avoid locking and cogging.

Below, an embodiment of the invention will be described in greater detail on the basis of the accompanying drawings.

BRIEF DESCRIPTION OF THE DRAWINGS

FIG. 2a shows the rear part off the operating guide mechanism with the roof element raised.

FIGS. 2b and 2c show the front and rear guide members in cross-sectional views taken along line A—A and B—B, respectively.

DESCRIPTION OF A PREFERRED EMBODIMENT

In the figures, identical components are designated by the same numerals.

Figure 1:
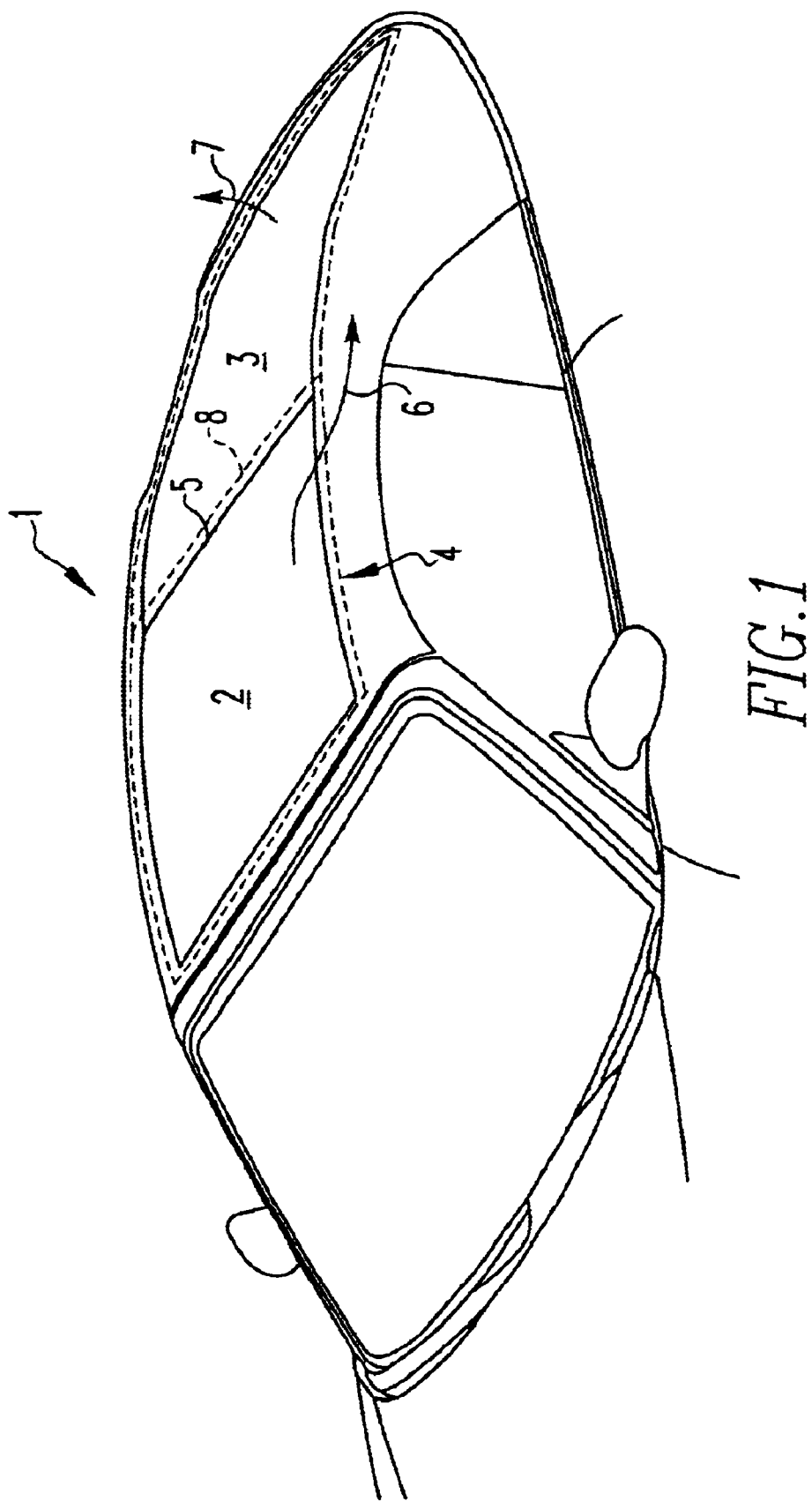
FIG. 1 is a perspective view of a vehicle roof with a sliding roof element lowered in its open position below a rear section of the vehicle roof.

A vehicle roof 1 as shown in FIG. 1, for a passenger car comprises a movable roof element 2 and a hatchback door 3 adjoining the roof element at the back end thereof, which are both disposed in an opening in the top of a vehicle. The roof opening is surrounded by a guide frame 4 which has opposite side sections and front and rear transverse sections. The movable roof element 2 and the hatchback door 3 are disposed directly adjacent each other along a separation line 5 so that, in the closed position of the roof element 2, the vehicle roof 1 smoothly joins the hatchback door 3.

The roof element 2 can be moved from the closed position as shown in FIG. 1 in accordance with the arrow 6 to an open position in which the roof element 2 is moved at least partially or, possibly fully, under the hatchback door 3. During the transition from the closed position to the open position, the roof element performs a combined horizontal and vertical movement.

The hatchback door 3 can preferably be lifted at its rear edge as indicated by the arrow 7, whereby it is pivoted about an axis which extends parallel to the separation line 5 between the roof element 2 and the hatchback door 3. In the area of the separation line 5, a transverse beam member 8 displaced downwardly toward the vehicle interior is provided between the side sections of the guide frame 4 on which the front edge of the hatchback door is pivotally supported.

Figure 2:
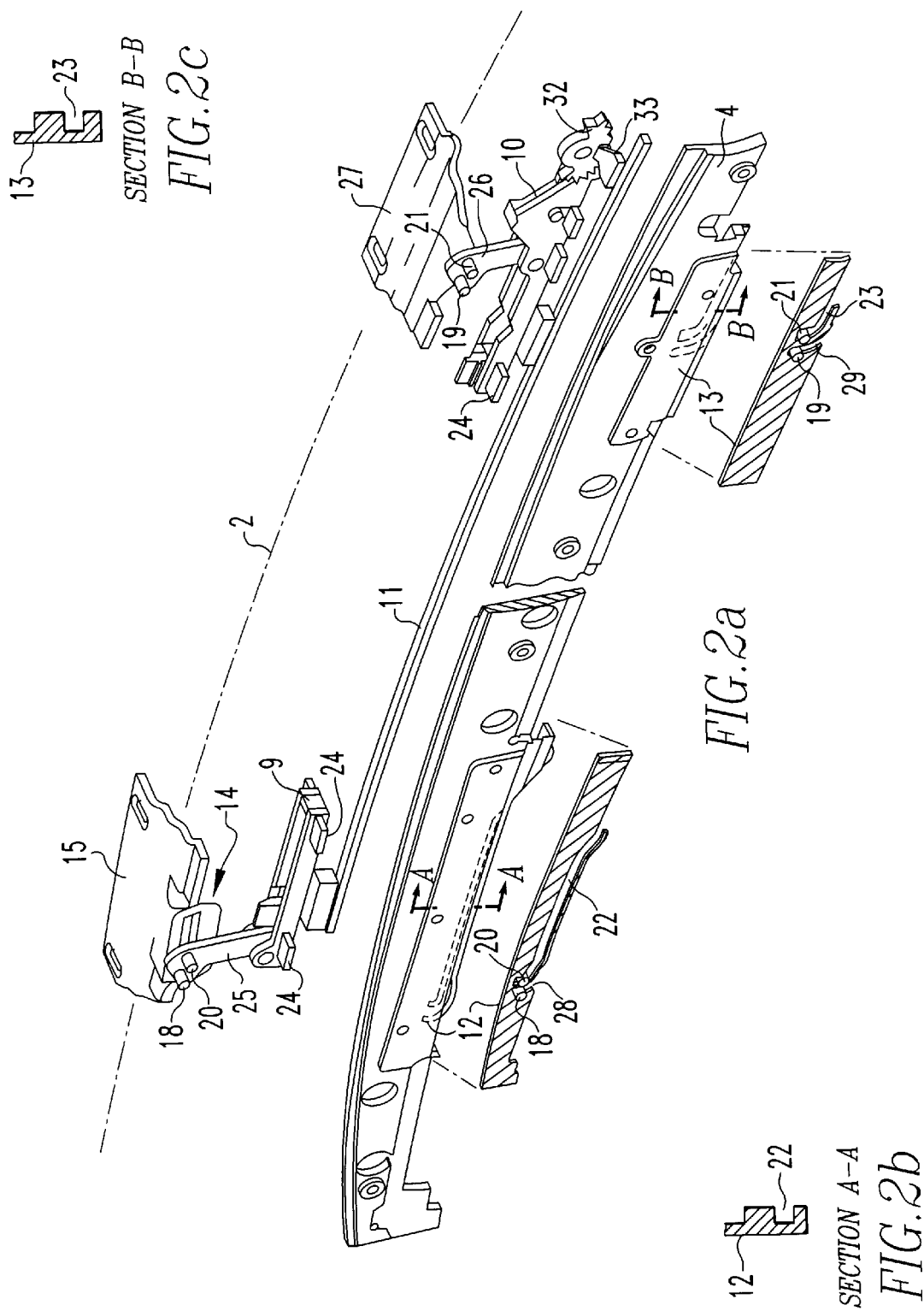
FIG. 2 shows the operating guide mechanism of the vehicle roof in an exploded view.
Figure 3:
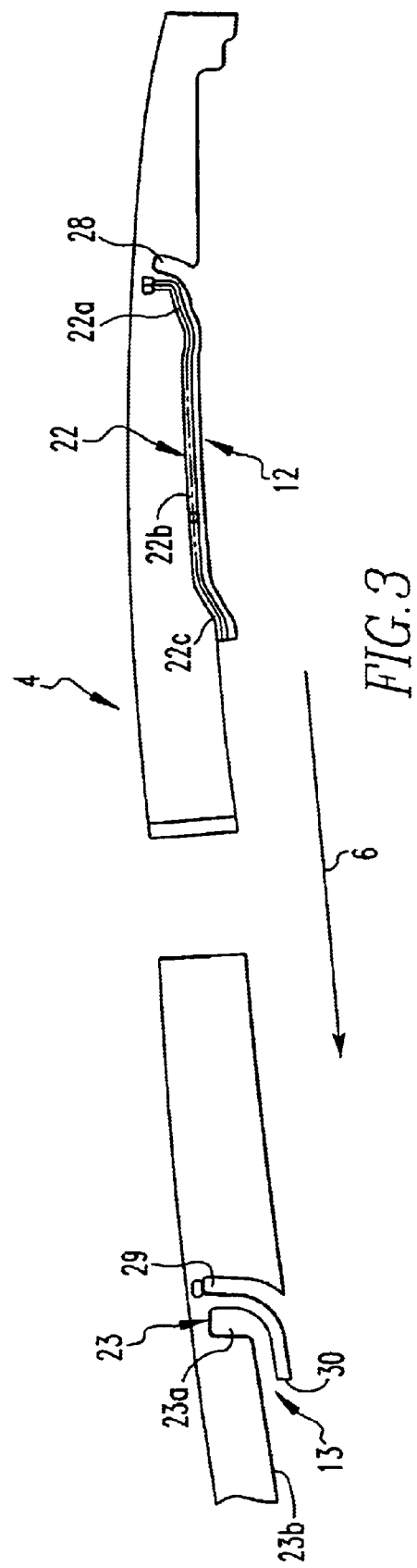
FIG. 3 shows a frame structure delimiting the vehicle roof opening with a front and a rear guide track by way of which opening movement of the roof element is controlled.

From FIGS. 2, 2a 2b and 2c, in combination with FIG. 3, the guide mechanism or kinematics of the sliding roof section 2 are apparent. The sliding roof segment 2 is moved by a front drive member 9 and a rear drive member 10 which are both slideably supported in a side guide frame member 4. They can be moved in the longitudinal direction of the vehicle forwardly or backwards by way of a drive cable 11. The drive members 9 and 10 are slidably supported in the side members of the guide frame 4 by slide shoes 24. Each drive member 9 or, respectively, 10 includes a lever 25 and respectively, 26, which is supported so as to be pivotable about a pivot axis extending transverse to the longitudinal direction of the vehicle. At the side remote from the drive member 9, or respectively 10, each lever 25 or 26 is connected pivotally with a front end connecting flange 15, or respectively, a rear end connecting flange 27, each of which is firmly connected with the sliding roof element 2. Because of the pivotable support for the levers 25 and 26 on the front or, respectively, rear drive member 9 and, respectively, 10 on one hand, and on the connecting flanges 15 and, respectively, 27 on the other hand, the roof element 2 can be moved horizontally in the longitudinal direction depending on the drive force generated by the drive cable 11. Furthermore, the roof section 2 can be moved vertically upwardly or downwardly by pivoting of the levers 25 and, respectively, 26.

The side section of the guide frame 4 consists in the example shown of two parts. A front guide track member 12 is arranged at the front part of the guide frame 4 and a rear guide track member 13 is arranged at the rear part of the guide frame 4.

It is noted that the guide track structure may be formed as an integral part of the guide frame or it may be a separate part attached to the guide frame. In this last case, the guide frame may consist of aluminum and the guide track structure may consist of a plastic material.

FIG. 3 shows the side of the guide track members facing the roof opening and the roof element. The guide track elements 12 and 13 are riveted onto the guide frame 4. The guide track members 12 and 13 extend around the bottom edge of the guide frame 4. On the face side of the guide frame as shown in FIG. 3, there are the guide channels 22 and 23 of the front guide track member 12 and, respectively, of the rear guide track member 13. In the front guide channel 22 of the front guide track member 12, a guide pin 18 is received, which is firmly connected to the lever 25 between the front drive member 9 and the front connecting flange 15. Correspondingly, the rear guide channel 23 of the guide track member 13 receives a guide pin 19, which is coupled to the lever 26 between the rear drive member 10 and the rear connecting flange 27.

The front guide channel 22 and the rear guide channel 23 comprise each several sections of different inclinations and/or levels. The front guide channel 22 comprises three individual sections 22a, 22b and 22c of which the center section 22b extends horizontally whereas the front section 22a and the rear section 22c are inclined. The rear guide channel 23 comprises a front section 23a with a vertical part and an adjacent section 23b, which extends essentially horizontally. The position of the respective guide pins 18 and 19 in the front sections 22a and, respectively, 23a corresponds herein to the closed position of the roof element 2; the position of the guide pins in the rear section 22c and, respectively, 23b corresponds to the open position of the roof element.

The vertical level difference of the front section 22a of the front channel 22 is smaller than that of the front section 23a of the rear guide channel 23. As a result, upon movement of the roof element from the closed position toward the open position, the roof element is lowered, at the beginning of the movement, to a lesser degree in the area of the front part 22a of the front guide track than in the area of the front part 23a of the rear guide track 23.

In addition to the level difference between the front part 22a of the front guide channel 22 and the front part 23a of the rear guide channel 23 there is also a difference in the inclination between these parts. The front part 22a of the front guide track has a lower average inclination than the front part 23a of the rear guide track 23, so that also the lowering rate of the roof element is less in the area of its front edge at the beginning of the opening movement than it is in the area of its rear edge.

During the further opening movement, the front guide pin 18 moves into the intermediate horizontally extending section 22b of the front guide track 22. Also, the rear guide pin 19 moves into the horizontally extending section 23b of the rear guide track 23. During this movement phase, the roof section is moved horizontally without vertical displacement.

In the last phase of the opening movement, the front guide pin 18 moves into the inclined rear part 22 of the front guide track 22 whereby the front edge of the roof element is lowered by a vertical distance which corresponds to the vertical height difference accommodated by the rear part 22c of the guide track 22. Expediently, the full vertical height difference of the front guide track which is composed of the individual height differences of the various sections of the front guide track, is the same as the full vertical height difference of the rear guide track 23 so that, at the end of the opening movement, the roof element is in its open position about parallel to the original position, that is its closed position, but is vertically and horizontally displaced below the rear hatchback door as shown in FIG. 3.

In certain cases, it may be expedient if the roof element is not deposited in the open position in parallel with its closed position in order to accommodate the curvature of a vehicle roof in the rear roof area. In that case, there is a smaller vertical height displacement in the front guide track than in the rear guide track. It may however be advantageous to provide guide track sections corresponding to the curvature of the roof.

Adjacent the front guide channel 22, there is an additional front guide channel 28 which extends essentially parallel to the front end section 22a of the front guide channel 27 and which is disposed in front of the front end section 22a. A corresponding additional guide channel 29 is arranged adjacent the rear guide channel 23, which additional guide channel 29 extends also parallel to, and is disposed in front of, the front section 23a of the rear guide channel 23. The additional front guide channel 28 as well as the additional rear guide channel 29 extend over about the same height difference as the respective front sections 22a and 23a.

In the additional guide channels 28 and 29, the guide bolts 20 and 21 are received (see FIG. 2), which extend parallel to the guide pins 18 and 19 that are supported by the levers 25 and 26, respectively. The guide bolts 20 and 21, which are received in the guide channels 28 and 29 provide for firm engagement of the roof elements in the guide channels at least during the first phase of movement when the roof element is opened and, vice versa, during the last phase of movement when the roof element is closed. This eliminates any play of the pins and respectively, bolts in the guide channels and therefore provides for a quiet movement. In addition, at least the rear additional guide bolt 21, which is guided in the rear additional guide channel 29 provides during the last movement phase of the closing movement of the roof element for the introduction of the guide pin 19 from the open area 23b of the rear guide channel 23 into the closed front part 23a. In this way, it is avoided that the rear guide pin 19 becomes entangled with the front edge 30 of the wall defining the front area 23a of the rear guide channel 23.

FIG. 2 shows a length compensation element 14, which comprises an elongated opening or slide slot 16 formed in a portion of the connecting flange 15 facing the guide frame 4. A guide member 17 extends into the slide slot 16, which guide member is connected to the lever 25. The slide slot 16 extends horizontally parallel to the longitudinal vehicle axis and permits back and forth movement of the guide member 17. During the transfer of the roof element between the closed and the open positions, the guide member 17 can slide back and forth in the slide slot 16 to accommodate length differences which are caused by a non-congruent construction of the guide elements 22 and 23.

The vehicle roof further includes as a safety device a crash locking structure 31 (see FIG. 2). The crash locking structure consists of a clamping member 32, which is pivotally supported on the rear drive member 10 and which has a lower edge provided with engagement teeth which, upon pivoting of the clamping member 32 about its pivot axis, firmly engage a stationary part, particularly the guide frame 4 for blocking opening movement of the roof element 2. In its normal operating position, the clamping member 32 is retained by a tongue 33, which extends from the drive cable 11 into a recess in the clamping member 32, in a neutral position in which the engagement teeth of the clamping member move over the guide frame 4 without coming in contact therewith. However, during an accident with high deceleration forces during which the drive cable may break, the tongue will move out of engagement with the clamping member 32 so that the clamping member will move out of its neutral position, which it maintains during normal operation of the vehicle, into a clamping position in which the clamping teeth at the lower edge of the clamping member firmly engage the guide frame for locking the roof element so as to prevent movement of the roof element in the roof opening of the vehicle roof.

What is claimed is:

1. A vehicle roof with a roof opening and a sliding roof element supported so as to be movable between a closed position, in which the roof element closes the roof opening, and an open position, in which the roof element is moved out of the roof opening into a position below a section of the vehicle roof adjacent to, and behind, the roof opening in a combined vertical and horizontal movement, said roof opening being delimited by a guide frame including, at each of the opposite sides of the opening, a guide track structure with separate front and rear guide track members including aligned front and rear guide track channels, said roof element having front and rear guide pins projecting therefrom into said front and rear guide track channels, respectively, to be guided thereby during movement of the roof element between its closed and open positions, said front and rear guide track channels having inclined front sections for lowering said roof element upon initial movement thereof out of its closing position wherein a front section of said front guide channel is inclined to a lesser degree than that of said rear guide channel, one of said front and rear guide pins extending into said front and rear guide channels being supported by a length compensation element for accommodating different distance requirements between the front and rear guide pins during transition of the roof element between the open and closed positions thereof, and at least one of said front and rear guide structures including an additional guide channel which extends parallel to the front section of the respective guide channel and in which an additional guide pin is slidably supported.

2. A vehicle roof according to claim 1, wherein said front guide channel includes a front section, a center section and a rear section, with said center section extending essentially horizontally.

3. A vehicle roof according to claim 2, wherein said front section of said front guide channel has a greater inclination with respect to said center section than said rear section of said front guide channel.

4. A vehicle roof according to claim 1, wherein said guide bolt and said guide pin are supported by the same component.

5. A vehicle roof according to claim 4, wherein said component is a lever which is pivotally supported by said drive member.

6. A vehicle roof according to claim 5, wherein a front drive member and a rear drive member are provided and each supports a pivot lever carrying a guide bolt and a guide pin.

7. A vehicle roof according to claim 1, wherein said guide track structure is integrated into said guide frame and said guide pins are connected to said movable roof element.

8. A vehicle roof according to claim 1, wherein said guide track structure is formed by a structure separate from said guide frame.

9. A vehicle roof according to claim 8, wherein said guide track structure consists of plastic and said guide frame consists of aluminum.

* * * * *